(12) United States Patent
Arvidsson

(10) Patent No.: US 6,926,472 B2
(45) Date of Patent: Aug. 9, 2005

(54) TOOL FOR CHIP REMOVING MACHINING AND ROTATABLE CUTTING INSERT FOR SUCH TOOLS

(75) Inventor: Peder Arvidsson, Gävle (SE)

(73) Assignee: Sandvik Aktiebolag, Sandviken (SE)

(*) Notice: Subject to any disclaimer, the term of this patent is extended or adjusted under 35 U.S.C. 154(b) by 166 days.

(21) Appl. No.: 10/392,873

(22) Filed: Mar. 21, 2003

(65) Prior Publication Data

US 2003/0219319 A1 Nov. 27, 2003

(30) Foreign Application Priority Data

Mar. 21, 2002 (SE) .............................................. 0200866

(51) Int. Cl.$^7$ .............................................. B23B 27/14
(52) U.S. Cl. ........................ 407/92; 407/110; 407/113
(58) Field of Search .............................. 407/11, 90, 88, 407/89, 113, 91, 102, 106, 110, 109

(56) References Cited

U.S. PATENT DOCUMENTS

| | | | |
|---|---|---|---|
| 2,885,766 A | | 5/1959 | Ernst et al. |
| 4,378,184 A | | 3/1983 | Briese |
| 4,477,211 A | | 10/1984 | Briese |
| 5,014,581 A | | 5/1991 | Komanduri et al. |
| 5,237,894 A | * | 8/1993 | Lindeke ..................... 82/1.11 |
| 5,478,175 A | | 12/1995 | Kraemer |
| 5,505,568 A | | 4/1996 | Takama et al. |
| 5,658,100 A | * | 8/1997 | Deiss et al. .................... 407/35 |
| 5,836,723 A | * | 11/1998 | Von Haas et al. .......... 407/107 |
| 5,924,826 A | * | 7/1999 | Bystrom et al. ............ 407/103 |
| 2003/0210961 A1 | * | 11/2003 | Arvidsson ..................... 407/48 |

FOREIGN PATENT DOCUMENTS

| | | |
|---|---|---|
| EP | 0 365 299 A2 | 4/1990 |
| WO | 01/98009 A1 | 12/2001 |

OTHER PUBLICATIONS

Sweden International Search Report dated Jun. 18, 2003.

* cited by examiner

Primary Examiner—Derris H. Banks
Assistant Examiner—Sara Addisu
(74) Attorney, Agent, or Firm—Burns, Doane, Swecker & Mathis, LLP

(57) ABSTRACT

A cutting tool includes a basic body having a insert seat and a rotatable cutting insert mounted on a connecting surface of the seat. The insert includes a chip cutting top side, a bottom side and an outer peripheral side, whereby there is a cutting edge in the area between the top side and the peripheral side. Formed on the connecting surface of the seat is at least one first ring formation, and formed in the bottom surface of the insert is at least one second ring formation having an equal diameter as the first ring formation. At least one of the first and second ring formations comprises a groove. The first and second ring formations are in direct or indirect engagement with each other in order to form a guide between the cutting insert and the basic body that permits rotation of the cutting insert about its own center axis and simultaneously keeps the insert in an exactly defined radial position.

28 Claims, 3 Drawing Sheets

TOOL FOR CHIP REMOVING MACHINING AND ROTATABLE CUTTING INSERT FOR SUCH TOOLS This application claims priority under 35 U.S.C. §119 to Patent application Ser. No. 0200866-2 filed in Sweden on Mar. 21, 2002, the entire content of which is hereby incorporated by reference.

TECHNICAL FIELD OF THE INVENTION

In a first aspect, this invention relates to a tool, intended for chip removing or chip forming machining of the type that comprises on the one hand a basic body having at least one insert seat, and on the other hand a rotatable cutting insert applicable in the same, which is intended to rotate around its own central geometric axis, and which includes a chip cutting top side, a bottom side, and a side surface, whereby there is a cutting edge in the area between the top side and the side surface.

Cutting tools of the type in question are primarily suitable for machining workpieces of metal, although they may also be used for other materials.

PRIOR ART

Cutting tools having rotatable cutting inserts of the type generally mentioned above are previously known from U.S. Pat. No. 2,885,766, No. 5,014,581, No. 5,478,175 and No. 5,505,568. Common for these known tools is, however, that the means for controlling the cutting insert and keeping the same in place in the desired position during rotation are complicated and unreliable in so far that several factors may contribute to the cutting inserts loosing the desired, exact geometrical position thereof in relation to the insert seat of the basic body. For instance, in the milling cutter that is described in U.S. Pat. No. 2,885,766, a central pin is used that extends through a central hole in the cutting insert in order to form an axis around which the cutting insert may rotate. Already the fact that the pin constitutes a separate element, which has to be fitted into holes in the basic body, may give rise to dimensional deviations that counteract exact determination of the position of the cutting insert (e.g. by the pin being deflected under the load of the cutting insert). The tools that are illustrated in the other three patent publications make use of complicated, expensive and unreliable bearing means for the cutting inserts. In two of these cases, viz. U.S. Pat. No. 5,014,581 and U.S. Pat. No. 5,478,175, it is implied that the cutting insert is manufactured with a long narrow, shaft-like bottom portion; something which makes the cutting insert voluminous and to a large extent limits the possibilities of applying many cutting inserts to one and the same basic body.

OBJECTS OF THE INVENTION

The present invention aims at obviating the above-mentioned disadvantages of previously known cutting tools having rotatable cutting inserts and at providing an improved cutting insert. Therefore, in a first aspect, a primary object of the invention is to provide a tool in which one or more rotatable cutting inserts may be applied in a reliable way and held in a well-defined geometrical positions by means of structurally simple and manufacturing-wise inexpensive means. An additional object is to provide a tool in which the individual cutting insert may be mounted and dismounted in a simple way and in a mounted state retain the exact position thereof in three orthogonal directions, in spite of the fact that the cutting insert at the same time rotates and is exposed to considerable external forces that act to dislodge the cutting insert from the desired position. More precisely it should be possible to control and keep in place the rotatable cutting insert in a reliable way by merely clamping with a tensile force that acts in one single direction against the cutting insert.

SUMMARY OF THE INVENTION

According to the invention, at least the primary object is attained by a tool for chip removing machining which comprises a holder and at least one cutting insert disposed in the holder. The holder includes a seat having a first connecting surface on which the insert is mounted. The insert includes a chip cutting topside, an outer peripheral side, and a cutting edge formed between the top side and the peripheral side. The cutting edge is coaxial with a geometric center axis of the insert. The bottom surface defines a second connecting surface facing the first connecting surface and forms therewith an interface between the insert and the holder. A guide structure is disposed in the interface for guiding the insert for rotation relative to the holder about the geometric center axis of the insert, while constraining the insert against radial movement relative to the holder. The guide structure includes first and second ring opposing formations on the first and second connecting surfaces, respectively, and being coaxial with the center axis. These opposing ring formations have substantially equal diameters, and at least one of the first and second ring formations is in the form of a circular groove.

In a second aspect, the invention aims at providing a rotatable cutting insert that is suitable use in the tool according to the invention. The features of this cutting insert include a body which defines a geometrical center axis of rotation and including a chip cutting top side, a bottom surface, an outer peripheral side, and a cutting edge between the top side and the outer peripheral side. The bottom side includes a circular ring formation in the form of a circular groove coaxial with the axis and adapted for receiving a coupling element of a holder.

By forming a first connecting surface in the form of one or more ring formations in the bottom side of the cutting insert in accordance with the invention, and letting the same interact with an analogous second connecting surface in the appurtenant insert seat in the basic body, the rotatable cutting insert may be reliably kept in place and controlled during the rotation thereof merely by an axial tensile force being applied against the top side of the cutting insert. Due to the fact that the interacting ring formations in the connecting surfaces are of a circular or rotationally symmetrical shape, the cutting insert is controlled around the geometrical rotation axis thereof in a very simple way by means of the applied axial tensile force, in that the ring formations make lateral displacements of the cutting insert in relation to the insert seat impossible. The fact that the control takes place in the interface between the two connecting surfaces does, among other things, involve the advantage that the cutting inserts may be manufactured with a flat and compact shape.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DESCRIPTION OF PREFERRED EMBODIMENTS OF THE INVENTION

Figure 1:
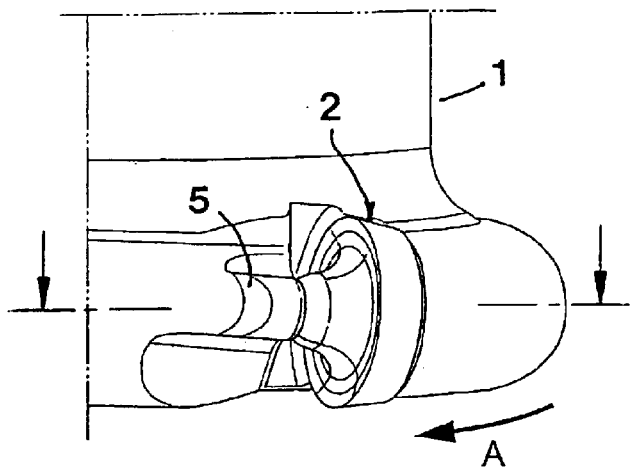
FIG. 1 is a partial perspective view of a tool, viz. a rotatable milling cutter having a rotatable cutting insert shown in the mounted state.
Figure 2:
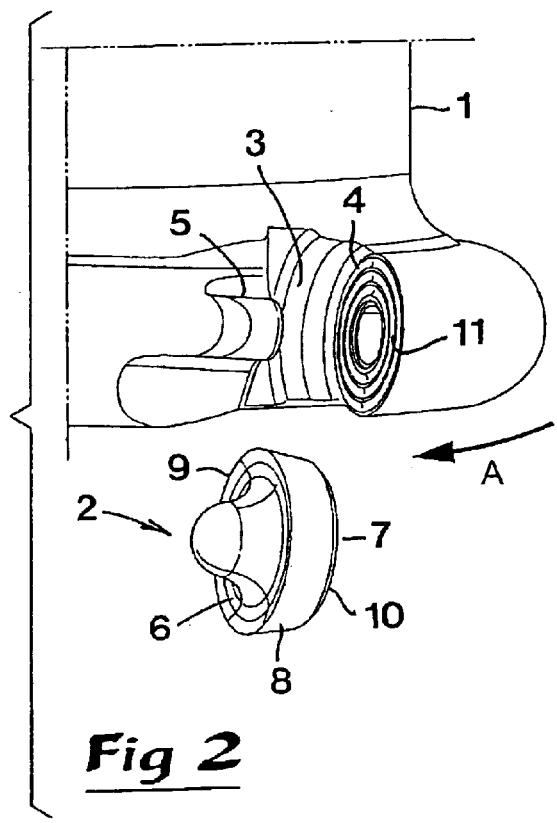
FIG. 2 is an analogous exploded view in perspective showing the same tool, but with the cutting insert removed from the appurtenant insert seat.
Figure 3:
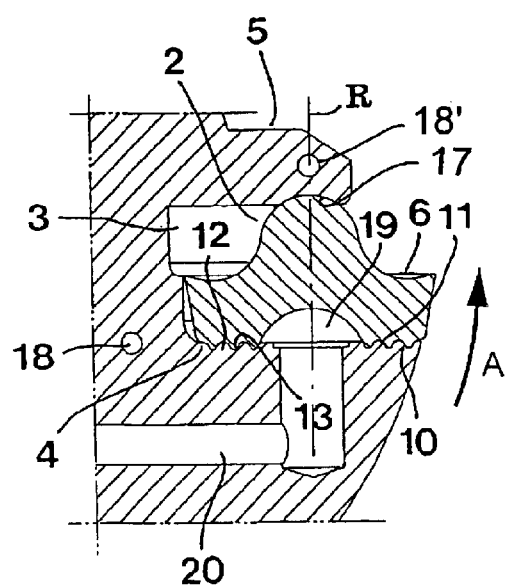
FIG. 3 is a partial, enlarged cross-section through the cutting insert along the line III—III of FIG. 1 and surrounding parts of the tool.

In FIGS. 1–5, numeral 1 generally designates a basic body of a holder and numeral 2 a rotatable cutting insert. The basic body and the cutting insert together form a tool for chip removing machining, suitably in workpieces of metal. The invention is applicable not only to rotatable tools, such as milling and drilling tools, but also to fixed tools, such as turning tools. In FIGS. 1–3, only one cutting insert is shown on the partially illustrated basic body of the tool. However, in practice, one and the same basic body may be equipped with a plurality of cutting inserts.

In the practical realization of the invention, the basic body may advantageously, though not necessarily, be manufactured from steel or other comparatively "soft" metal, while the cutting insert is made from a considerably harder and more wear-resistant material, such as conventional cemented carbide, ceramics or the like. In a particularly preferred embodiment, the basic body is made from steel, while the cutting insert is made from, or covered with, silicon nitride. Thus, the combination steel/silicon nitride demands minimal amounts of lubricating fluid in order to enable the rotation of the cutting insert in relation to the basic body.

In the basic body 1, which in the example consists of a rotatable cutter head, a peripheral recess 3 is formed that separates a so-called insert seat 4 from a schematically shown clamping device 5. The basic body 1 is rotatable in the direction of the arrow A. This implies that the insert seat 4 is located behind or after the clamping device during rotation. As is seen in FIG. 3, the clamping device 5 has a considerably smaller radial extension than the insert seat and the cutting insert 2, respectively, which means that the clamping device never gets into contact with the workpiece that is to be machined.

The cutting insert 2, which is intended to rotate around its central geometric axis R, has a chip cutting front or top side 6, a bottom side 7, as well as a peripheral side surface 8, which in the example is endless and of a rotationally symmetrical basic shape. In the area between said side surface 8 and the top side 6, a cutting edge 9 is formed, which is most suitably endless, i.e. extends continuously along the periphery of the cutting insert. In the preferred embodiment thereof, the cutting insert is of a generally rotationally symmetrical basic shape about the axis R.

The insert is held against movement relative to the holder in a direction radially of the axis of rotation R by a guide structure situated at the interface between the insert and the holder. The interface is defined by first and second connecting surfaces 11, 10, respectively, of the holder and the insert. In the cutting insert 2, the second connecting surface 10 comprises one or more first, circular ring formations and is arranged to interact with the first connecting surface 11, formed in the insert seat 4 of the basic body 1. The first connecting surface 11 comprises one or more second, circular ring formations having substantially the same diameter as respective ring formations of the second connecting surface. Thus, the first and second ring formations oppose one another.

Figure 6:
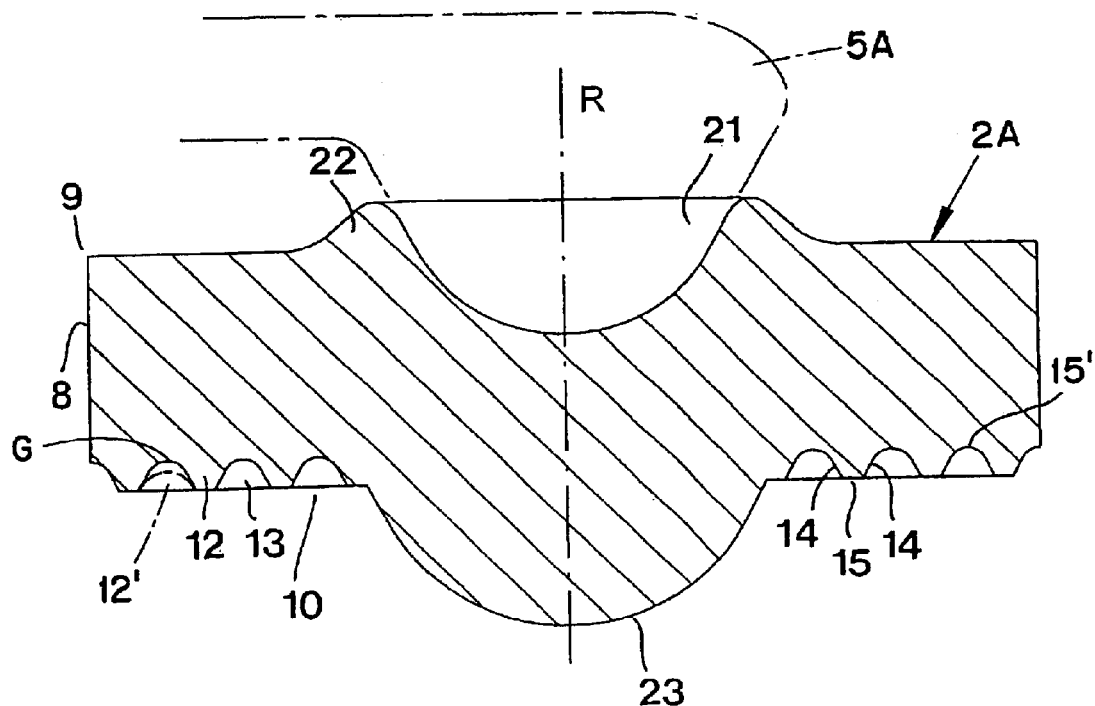
FIG. 6 is a strongly enlarged cross-section through an alternative embodiment of the cutting insert.

In FIG. 6, a connecting surface 10 of an alternative embodiment of a cutting insert 2A is shown in an enlarged state. As is clearly seen in this figure, the ring formations of each connecting surface consist of a plurality of alternating ridges and grooves 12, 13. The ridges 12, as well as the grooves 13, are of circular shape with reference to the axis R. Generally, the ridges as well as the grooves are of a tapering cross-sectional shape. The ridges are tapered in a direction toward the opposing connecting surface, whereas the grooves are tapered in a direction away from the opposing connecting surface. Thus, the individual ridge is defined by two flank surfaces 14 disposed on respective sides of an apex or peak 15, whereby the two flank surfaces 14 are inclined at an acute angle (e.g. about 60°) to each other. In this way, the ridge obtains a generally wedge-like cross-section shape.

The individual groove 13 is defined between two flank surfaces 14 of adjacent ridges, and an intermediate bottom 15', which advantageously may be of a curved shape. The individual ridge 12 on the cutting insert 2 has the purpose of engaging an opposing groove of corresponding diameter in the connecting surface 11 of the basic body. Each groove and its associated ridge on the opposing connecting surface together form a ridge-and-groove coupling. Hence, it axiomatically follows that the ridges 12' that are included in the connecting surface 11 will engage the grooves 13 in the connecting surface 10. Furthermore, it should be noted that the individual ridge 12 or 12' in one of the connecting surfaces should have a height which is smaller than the corresponding groove in the other connecting surface so that the ridges will not touch the bottom in the appurtenant grooves, i.e., a gap G will be formed, as depicted in FIG. 6. The insert 2 of FIGS. 1–5 has a similar ridge/groove configuration.

Since each connecting surface in the illustrated, preferred examples according to FIGS. 1–5 and 6 includes a plurality of grooves, spaced-apart via ridges, the different ridges in the same connecting surface will have different diameters with reference to the geometric center R of the insert (which defines an axis of rotation for the insert). However, in order for the connecting surfaces to be able to engage each other, the individual ridge in one of the connecting surfaces must have the same diameter as an interacting groove in the other connecting surface. It should also be noted that the connecting surface 10 on the cutting insert is formed as near to the outer periphery of the cutting insert as possible. Since the connecting surface 10 does not extend along the entire bottom side of the cutting insert, but rather only along a ring-shaped area near the outer periphery, as is shown in the examples, the radial distance between the largest or outer ring formation and the periphery of the cutting insert will be shorter than the radial distance between the smallest or innermost ring formation and the center R of the cutting insert. Each of the two connecting surfaces may advantageously be plane in so far that the peaks 15 on the ridges 12 are located in a common plane. However, it is also feasible to form the connecting surfaces as slightly curved.

The cutting edge 9 of the cutting insert 2 is, in the shown examples, of a genuinely circular shape and is concentrical with the central rotation axis R. However, within the scope of the invention, it is feasible to form the cutting edge with a slightly oval or elliptical shape. In this connection, it should also be pointed out that the imaginary, geometrical plane in which the cutting edge 9 is situated, is parallel to the bottom side of the cutting insert as defined by the plane in which the peaks 15 of the ridges 12 are located. Alternatively, however, those two planes could be inclined in relation to each other.

In the embodiment example according to FIGS. 1–5, the peripheral side surface or envelope surface 8 of the cutting insert is conical. More precisely, the peripheral side surface tapers (converges) in a direction away from the cutting edge 9 towards the bottom side of the cutting insert, i.e. the geometry of the cutting insert is generally positive. This means that the top side of the cutting insert has a projection area that is larger than the projection area of the bottom side. Although the side surface 8 in the preferred example is smooth in that the conicity has been produced by a linear generatrix, it is also feasible to bring about the tapering shape in another way, e.g. by geometrically producing the surface by means of a bent, preferably concavely bent curve or generatrix.

On the top side of the cutting insert, there is a means for connecting the cutting insert to the clamping device 5. Said coupling means may advantageously be of rotationally symmetrical basic shape and be centrally positioned on the top side of the cutting body. In the example according to FIGS. 1–5, the coupling means consists of a male member or projection 16 protruding from the top side 6 of the cutting insert. The shape of said male member may be stump-like, whereby a free upper end 16' is of a partially spherical or cap-like shape. In the area between the cutting edge 9 and the protruding male member 16, the top side of the cutting insert may be formed with a ring-shaped concave countersink 16". During operation of the cutting insert, the protruding male member serves as a chip breaker that aims to disintegrate the chip or chips that are initially separated from the workpiece at the cutting edge and then slide forward along the concavely curved top side of the cutting insert.

FIG. 3 shows how the clamping device 5 consists of an elastically deformable nose that has a partially spherical seating 17 on the bottom side thereof, in which the cap-like end portion 16' of the male member 16 may engage. In the tool body and the nose, respectively, there are holes 18, 18' for the receipt of respective pins of a clamping key (not shown), by means of which the nose 5 may be upwardly deflected in order to enable insertion of the exchangeable cutting insert in the space between the nose and the insert seat 4.

Figure 4:
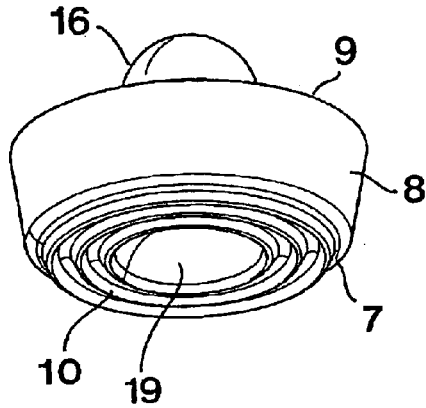
FIG. 4 is a perspective view of solely the cutting insert, the same being viewed obliquely from below.
Figure 5:
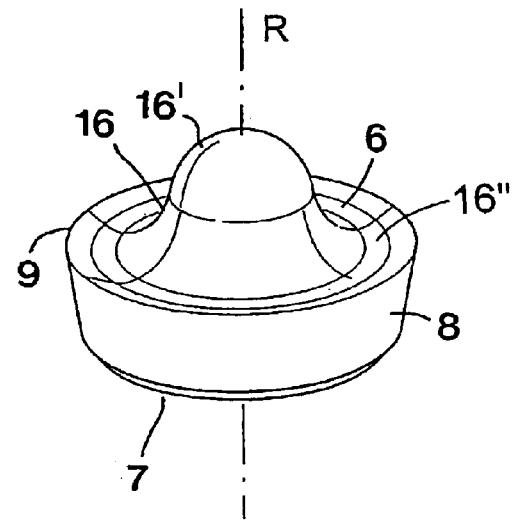
FIG. 5 is a corresponding perspective view showing the same cutting insert obliquely from above.

As is seen in FIGS. 3 and 4, a central countersink 19 is formed in the bottom side of the cutting insert, which advantageously may have a bowl-like, concavely curved shape. The countersink 19 forms a hollow space into which a suitable lubricating fluid may be inserted via a channel 20 formed in the basic body 1, which channel ports into the insert seat 4, more precisely centrally therein. The lubricating fluid may be supplied at a certain overpressure, whereby the fluid will be pressed out in the interface between the inter-engaging ridges and grooves in the two connecting surfaces 10, 11. Such lubricating fluid may also be supplied to the interface between the seating 17 of the nose 5 and the cap-formed upper end of the male member 16, although no duct system for this purpose has been shown in the drawings. By supplying lubricating fluid to the interfaces between the surfaces that are in contact with each other, the rotation of the cutting insert is facilitated.

In this connection, it should be pointed out that the cutting insert in the illustrated embodiment example is freely, or self-rotating in that in the mounted state it is set in rotation only by means of the forces (axial, radial and tangential) that are applied to the cutting insert during the machining of a workpiece. An alternative arrangement would be to set the cutting insert in rotation by means of a particular drive mechanism (not shown), built into the basic body.

An advantage of the tool according to the invention is that the individual cutting insert may be kept in place and controlled in a reliable way by means of a moderate or slight tensile force (from the nose 5) that acts in one single axial direction against the cuffing insert, whereby the cutting insert is clamped solely by pressure forces, i.e. without any harmful tensile or shearing forces affecting the same. Thus, by means of the single pressure force, the cutting insert is always kept located at the origin of the coordinates in an imaginary system of co-ordinates, more precisely thanks to interaction between the circular ring formations in the respective connecting surfaces. Thus, during rotation of the cutting insert, the axial tensile force ensures that the cutting insert is unable to tilt in relation to the insert seat despite the cutting insert being exposed to peripheral axial forces on the contact thereof with the workpiece. Simultaneously, the inter-engaging ring formations ensure that the cutting insert—irrespective of the rotation angle position in relation to the insert seat—is not displaced laterally in relation to the axis R. This in turn involves the advantage that the cutting insert may be manufactured, e.g. direct pressed, with a flat, compact shape, whereby the cutting insert may be brought to rotate without the help of bearing means other than the ring formations in the connecting surfaces. In this connection, it should be pointed out that the invention can be realized in a particularly advantageous way if the tool body is made from steel and the cutting insert from silicon nitride, since the friction between steel and silicon nitride is minimal, whereby rotation of the cuffing insert may be effected with a minimum of lubricant.

Reference is now made to FIG. 6, which illustrates the alternative embodiment of the cutting insert 2A. In this case, the cutting insert is, on the top side thereof, formed with a central, bowl-shaped seating 21 for receipt of a nose 5A of a clamp. The seating 21 is surrounded by an endless collar 22, serving as a chip breaker. In the area between the cutting edge 9 and the collar 22, the top side of the cutting insert is plane. Furthermore, the cutting insert has a neutral geometry in that the side surface or the envelope surface 8 is cylindrical. This means that the top and bottom sides of the cutting insert have one and the same projection area. On the bottom side of the cutting insert, a central projection 23 is formed, outside of which the connecting surface 10 is formed. The volume of the projection 23 should not substantially deviate from the volume of the seating 21. In that way, the cutting insert in all essentials obtains a uniform thickness along the entire extension thereof.

Feasible Modifications of the Invention

Figure 7:
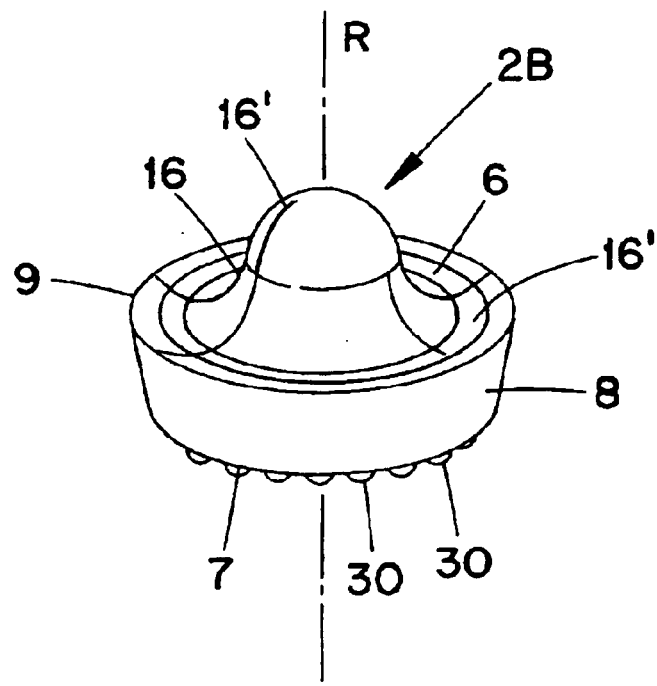
FIG. 7 is a view, similar to FIG. 5 showing an alternative form of ring structure.
Figure 8:
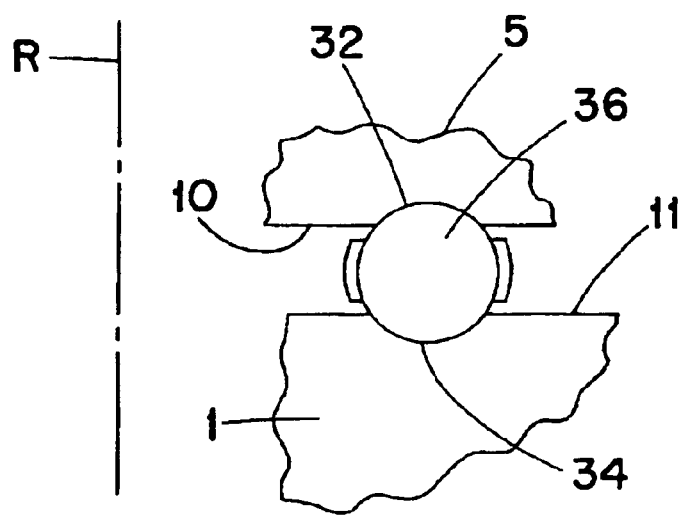
FIG. 8 is an enlarged fragmentary view of a guide structure composed of opposing grooves in which bearing elements are disposed.

The invention is not limited solely to the embodiments described above and illustrated in the drawings. Thus, the design of the first connecting surface on the cutting insert, as well as the second connecting surface in the insert seat, may vary most considerably. For instance, only one single simple ring formation, e.g. a ridge, may be formed on the cutting insert (instead of a plurality of concentric ridges) in order to be brought into engagement with one single ring formation, e.g. a groove, included in the connecting surface of the insert seat. It is even possible, as shown in FIG. 8, that the first ring formation or ring formations formed in the connecting surface of the cutting insert, as well as the second ring formation or ring formations formed in the connecting surface of the insert seat, could be in the form of grooves 32, 34 into which a common, but separate, bearing means could be provided, such as, for instance, consisting of a glide ring, a caged ball bearing 36 or a set of loose balls, rolls or the like. In this connection, it should also be mentioned that an individual ridge having the purpose of engaging a groove in an opposite connecting surface does not necessarily need to be of uniform thickness or even extend continuously along the entire circumferential extension of the circle. Thus, the ridge may be formed by mutually circumferentially spaced-apart, short projections, e.g. partially spherically shaped projections 30 (see FIG. 7). Thus, the concept "ring formations", as this is used in the appended claims, should be interpreted in the widest sense to include a continuous ridge, or an interrupted ridge on either or both of the insert and the holder.

In the embodiment examples illustrated in the drawings, the lubricating fluid channel is shown as porting in the insert seat in order to directly lubricate the interface between the insert seat and the bottom side of the cutting insert. However, it is also feasible to form the channel in another way, e.g. so that it ports into the clamping device for the cutting insert in order to lubricate the contact surfaces between the clamping device and the male member (or the seat) on the top side of the cutting insert. In this connection, it should also be pointed out that the actual cutting insert may be formed with a through-going channel, allowing the fluid to pass from the top side to the bottom side, and from the bottom side to the top side, respectively, of the cutting insert.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool for chip removing machining comprising a holder and a cutting insert disposed in the holder; wherein:
   the holder includes a seat having a first connecting surface on which the insert is mounted,
   the insert including a chip cutting top side, a bottom surface, an outer peripheral side, and a cutting edge formed between the top side and the peripheral side, the cutting edge being coaxial with a geometric center axis of the insert, the bottom surface defining a second connecting surface facing the first connecting surface and forming therewith an interface between the insert and the holder,
   a guide structure disposed in the interface for guiding the insert for rotation relative to the holder about the geometric center axis of the insert during a cutting operation, while constraining the insert against radial movement relative to the holder, the guide structure including first and second opposing ring formations on the first and second connecting surfaces, respectively, and arranged coaxially with the center axis, the first and second ring formations having substantially identical respective diameters with reference to the center axis, at least one of the ring formations comprising a circular groove.

2. The tool according to claim 1 wherein the first and second ring formations define a ridge-and-groove coupling comprised of a ridge structure formed on one of the connecting surfaces, and a groove structure formed in the other of the connecting surfaces and receiving the ridge structure.

3. The tool according to claim 2 wherein the ridge-and-groove coupling comprises a ridge structure and a concentric groove structure formed on each of the connecting surfaces and respectively mating with the groove structure and the concentric ridge structure of the other connecting surface.

4. The tool according to claim 2 wherein the ridge structure is continuous around the center axis.

5. The tool according to claim 3 wherein the ridge structure comprises a plurality of concentric ridges, and the ring structure comprises a plurality of concentric grooves alternating with the ridges.

6. The tool according to claim 5 wherein each ridge has a tapering cross sectional shape in a direction toward the opposing connecting surface.

7. The tool according to claim 6 wherein each groove has a tapering cross sectional shape in a direction away from the opposing connecting surface.

8. The tool according to claim 5 wherein peaks of the ridges of the first connecting surface lie in a common plane, and peaks of the ridges of the second connections surface lie in a common plane.

9. The tool according to claim 5 wherein a radial distance from a radially outermost ring formation of the second connecting surface to an outer peripheral edge of the second connecting surface is shorter than a distance from a radially innermost ring formation of the second connecting surface to the geometrical center axis.

10. The tool according to claim 1 wherein the holder further includes a clamp spaced from and facing the first connecting surface, the clamp including a free end bearing frictionally against the top side of the insert, the insert being freely rotatable relative to the clamp during a culling operation.

11. The tool according to claim 10 wherein the free end of the clamp includes a recess receiving a projection of the top side, the recess and projection configured symmetrically about the geometric center axis.

12. The tool according to claim 11 wherein the recess and the projection have a corresponding spherical shape.

13. The tool according to claim 10 wherein the free end includes a projection received in a recess of the top side, the projection and the recess configured symmetrically about the geometric center axis.

14. The tool according to claim 13 wherein the recess and the projection have a corresponding spherical shape.

15. The tool according to claim 1 wherein the interface constitutes a first interface, there being second interface defined between the clamp and the top side, the tool further comprising a lubricant channel formed in the holder for conducting lubricant to one of the first and second interfaces.

16. The tool according to claim 1 wherein the holder includes a lubricant channel for conducting lubricant to the interface.

17. The tool according to claim 1 wherein the guide structure comprises opposing annular grooves formed in the first and second connecting surfaces respectively, the opposing grooves being of equal diameter to form an annular space therebetween, and bearing elements disposed in the annular space.

18. A rotary cutting insert for chip removing machining, comprising a body defining a geometrical center axis of rotation and including a chip cutting top side, a bottom surface an outer peripheral side, and a cutting edge between the top side and the outer peripheral side, the bottom side including a circular ring formation in the form of a circular groove coaxial with the axis and adapted for receiving a coupling element of a holder.

19. The insert according to claim 18 wherein the bottom surface further includes another circular ring formation in the form of a circular ridge structure arranged concentrically with the groove.

20. The insert according to claim 19 wherein there are at least two circular ridge structures and at least two circular groove structures.

21. The insert according to claim 18 wherein the groove has a cross sectional shape tapering in a direction toward the top side.

22. The insert according to claim 20 wherein peaks of the ridge structures are disposed in a common plane.

23. The insert according to claim 22 wherein a radial distance between a radially outermost one of the circular grooves and the outer peripheral side is shorter than a radial distance between a radially innermost circular groove and the axis.

24. The insert according to claim 18 wherein the top side includes a projection, configured symmetrically about the axis.

25. The insert according to claim 24 wherein the projection is spherically shaped.

26. The insert according to claim 18 wherein the top side includes a recess configured symmetrically about the axis.

27. The insert according to claim 26 wherein the recess is spherically shaped.

28. The insert according to claim 18 wherein the bottom surface includes a countersink situated inside of the circular groove.

* * * * *